United States Patent [19]

Raab

[11] Patent Number: 4,668,953

[45] Date of Patent: May 26, 1987

[54] ELECTRICAL POWER DIVIDERS

[75] Inventor: Anthony R. Raab, Beaconsfield, Canada

[73] Assignee: COM DEV Ltd., Cambridge, Canada

[21] Appl. No.: 725,252

[22] Filed: Apr. 19, 1985

Related U.S. Application Data

[63] Continuation-in-part of Ser. No. 555,125, Nov. 25, 1983.

[51] Int. Cl.[4] .......................... G01S 3/22; G01S 3/24; G01S 3/26

[52] U.S. Cl. .................................... 342/373; 333/110

[58] Field of Search ................ 343/373; 333/110, 126, 333/129, 132, 134, 28 R

[56] References Cited

U.S. PATENT DOCUMENTS

| | | | |
|---|---|---|---|
| 2,245,660 | 6/1941 | Feldman et al. | 343/373 |
| 3,252,113 | 5/1966 | Veltrop | 333/110 |
| 3,258,774 | 6/1966 | Kinsey | 343/373 |
| 3,824,500 | 7/1974 | Rothenberg | 343/373 |
| 4,147,980 | 4/1979 | Rook | 455/81 |

*Primary Examiner*—Theodore M. Blum

*Attorney, Agent, or Firm*—Chilton, Alix & Van Kirk

[57] ABSTRACT

A Beam-forming Network includes a plurality of directional couplers and phase shifters and which can interconnect both a transmitter and a receiver to the same group of radiating elements of an antenna even though the transmitter frequency band is different and well spaced from the receiver frequency band. This is accomplished, in accordance with the invention, by using directional couplers each of which has a variable response over a wide band of frequencies but which is designed so that its response over the transmitter frequency band is stable and its response over the receiver frequency band is also stable.

9 Claims, 6 Drawing Figures

ELECTRICAL POWER DIVIDERS

CROSS REFERENCE TO RELATED APPLICATION

This is a continuation-in-part application of parent application Ser. No. 555,125, filed Nov. 25, 1983.

BACKGROUND OF INVENTION

1. Field of the Invention

The present invention pertains generally to electrical power dividers and specifically to methods for connecting one or more ports to a number of other ports in such a way that the amplitude and phase excitations of the ports can be controlled within close limits over a wide range of frequencies.

The invention more specifically pertains to Beam-forming Networks including power dividers having wide band frequency responses.

2. Description of Prior Art

Beam-forming Networks, or BFN's, are employed in many antenna applications to generate multiple beams or combinations of beams in both terrestrial and space-borne applications. In the former, BFN's can be used for the generation of spatially coincident beams at different frequencies. In the space-borne case, BFN's can be used to form shaped beams covering limited footprints on the earth's surface.

The BFN's are composed of a number of different parts, for example, radiating elements, interconnecting transmission lines, power dividing elements, phase shifters and transformers. The radiating elements are typically used for feeding a collimating objective, such as a lens or reflector, in such a way that an individual elemental beam is associated with each radiating element. The final beam configuration formed by the BFN in association with the objective is the vector sum of the elemental beams with amplitudes and phases determined by the design of the BFN. The BFN may also be used to feed an array of radiators forming several beams without the use of a collimating objective.

The principal part determining the amplitude excitations of the radiating elements is the power dividing part. In many systems, this part may take the form of a directional coupler of which several forms exist in many widely-used types of transmission lines. Typical directional couplers in which the power division ratio can be easily and conveniently altered include such devices as branch-line couplers, short slot hybrids, and proximity couplers.

One of the principal limitations in the design of BFN's is the relatively narrow bandwidth of the parts forming the BFN. Bandwidths up to 15% are typically required for many applications which require relatively stable variation of coupling radio and phase as a function of frequency. In the types of couplers described above, which, in their waveguide applications are suitable for very high radio-frequency powers, coupling ratio flatness of $\pm 0.25$ dB is achievable over these 15% bandwidths. At larger bandwidths, the flatness degrades.

In several instances, BFN's must be designed to accommodate widely separated frequency bands. For example, the BFN may have to carry a transmit band and a receive band of frequencies. Where the frequency separation is large, prior experience of the available bandwidth of power dividers has dictated that the individual BFN's be designed to separate the transmit and receive bands into two networks. The two networks are then combined by means of a number of frequency combining networks (or diplexers), one for each radiating element.

As will be appreciated, especially in space applications, it is desirable to reduce the weight of the space borne components as a reduction in weight means that less fuel is required to control the spacecraft. Accordingly, with the same fuel load, a lighter spacecraft will be able to stay aloft for a greater period of time.

It would therefore be desirable to provide a BFN whose frequency response is broad enough so that it is responsive to both receive and transmit frequencies. With such a BFN, only a single BFN would be needed for both the transmit and receive functions thus eliminating a complete BFN relative to the prior art. Such a BFN would not need a diplexer for each radiating element; the weight of such a BFN would be less than half of the weight of a presently existing BFN.

SUMMARY OF INVENTION

It is therefore an object of the invention to provide a BFN for use with two widely separated frequencies or frequency bands whose response is broad enough to include both the frequencies or frequency bands.

It is a more specific object of the invention to provide such BFN's which include power dividers, the frequency response of the power dividers being broad enough to include the two frequencies or frequency bands.

In accordance with the invention there is provided a Beam-forming Network for use in association with a plurality of radiating elements, transmitter means having an output terminal and being operable at a transmitter frequency band and receiver means having an input terminal and being operable at a receiver frequency band. The transmitter frequency band is different and spaced from the receiver frequency band. The Beam-forming Network interconnects the transmitter means and the radiating elements and the Beam-forming Network interconnects the receiver means and the radiating elements. The Beam-forming Network may be connected to a diplexer means having at least a first port, a second port and a third port, the first port being connected to the output terminal of the transmitter and the second port being connected to the input terminal of the receiver, and the third port being connected to the BFN. The BFN is composed of individual power divider elements or couplers which may have different coupling ratios and which are variably responsive to a wide band of frequencies, the wide band including the transmitter frequency band and the receiver frequency band, the power divider means being designed for stable response within the transmitter frequency band and within the receiver frequency band.

The variability in the response of the individual couplers are such that the responses effectively compensate for the amplitude slope in most cases, resulting in wide bandwidth of flat frequency response simultaneously in the transmitter and receiver frequency bands.

BRIEF DESCRIPTION OF DRAWINGS

The invention will be better understood by an examination of the following description, together with the accompanying drawings, in which.

DESCRIPTION OF PREFERRED EMBODIMENTS

Figure 1:
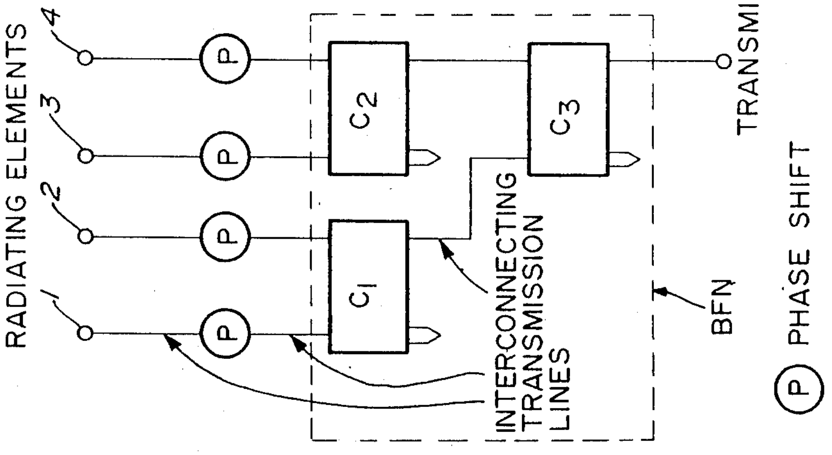
FIG. 1 (PRIOR ART)
FIG. 1 illustrates a typical Beam-forming Network of the prior art.

Turning now to FIG. 1, a prior art BFN will comprise a plurality of power dividing means such as the directional couplers C1, C2 and C3. Such a system is illustrated in, for example, U.S. Pat. No. 2,245,660, Feldman et al. As seen in FIG. 1, the port at one side of C3 is connected to, for example, a transmitter. The two ports on the other side of C3 are connected, respectively, to ports on the one side of C1 and C2.

The beam forming network illustrated in FIG. 1 also includes phase shift means P. The two ports on the other side of C1 and C2 are connected to the phase shift means, and the phase shift means are in turn connected, respectively, to radiating elements 1, 2, 3 and 4. The radiating elements may, for example, be feedhorns feeding a collimating objective as discussed above, or as in Feldman may be elements of an array.

Figure 2:
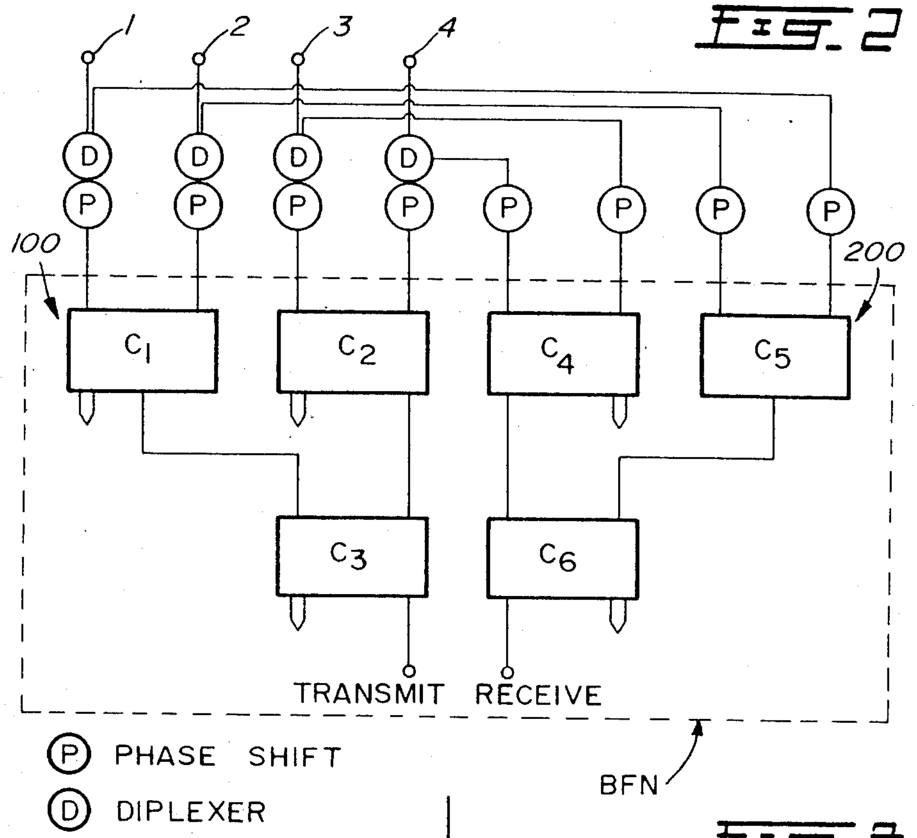
FIG. 2 illustrates how BFN's of the prior art may be combined by means of a Frequency-combining Network (FCN), or diplexer, so as to perform separate transmit and receive functions.

FIG. 2 illustrates a transmit BFN 100 and a receive BFN 200, and illustrates how these are combined so that they can use a single antenna in the case when transmit and receive frequencies are widely separated and the power dividing elements C1 through C6 have insufficient bandwidth to carry more than one band of frequencies. As can be seen, the phase shifters of both BFN's are connected respectively, to diplexers D, and the diplexers are, in turn, connected to the radiating elements 1, 2, 3 and 4. The diplexers may be of the type which are shown in, for example, U.S. Pat. No. 3,252,113, Veltrop or U.S. Pat. No. 4,147,980, Rook. It can therefore be seen that two complete BFN's are necessary to connect a transmitter and receiver to a single antenna when the transmit and receive frequencies are widely separated. In addition, such combining requires a separate diplexer for each radiating element.

Figure 3:
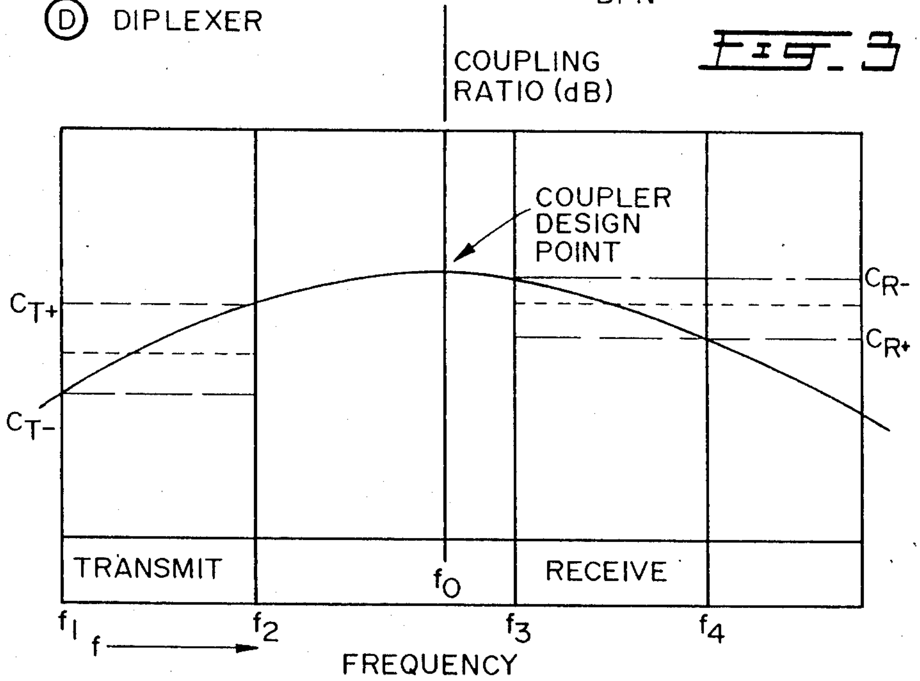
FIG. 3 is a graph which depicts the way in which a power-dividing element, such as a directional coupler, can be designed so as to permit independent control of the coupling ratios in two separate frequency bands.

Turning now to FIG. 3, we see a graph of frequency versus coupling ratio for a power divider, or coupler, to be used in a BFN in accordance with the present invention. As is well known, coupling ratio may be defined as a decibel equivalent of the power transferred into the coupled arm relative to the power entering the coupler.

The coupler, whose response is illustrated in FIG. 3, would be designed to couple a band of transmit frequencies, F1 to F2, and a band of receive frequencies, F3 to F4. The design frequency of the coupler is F0.

It can be clearly seen that the design frequency of the coupler whose response is illustrated in FIG. 3 is not midway between the band of frequencies but is rather biased toward the upper band of frequencies. In this case, the coupling ratio for the higher band of frequencies will be greater than the coupling ratio for the lower band of frequencies.

As the variation of coupling ratio versus frequency is typically symmetric about the design frequency, a higher coupling ratio can be designed for one frequency band versus another by simply biasing the design frequency of the coupler to be closer to the one frequency band. It can also be seen that, with a single coupler, two different coupling ratios can be provided at two different bands of frequencies. In addition, the coupling ratio response within each band is relatively flat, though possessing slope, so that a single coupler can provide stable operation in two frequency bands even when the frequency bands are widely separated.

By appropriate design techniques, the other characteristics of the coupler, namely phase, directivity, return loss and insertion loss, can also be kept very stable over frequency. In particular, output phase difference can be kept at a constant 90° over both of the required bandwidths.

The coupler may also be arranged to operate at the same coupling ratio in both frequency bands by simply designing the coupler so that its design frequency is midway between the bands.

Figure 4:
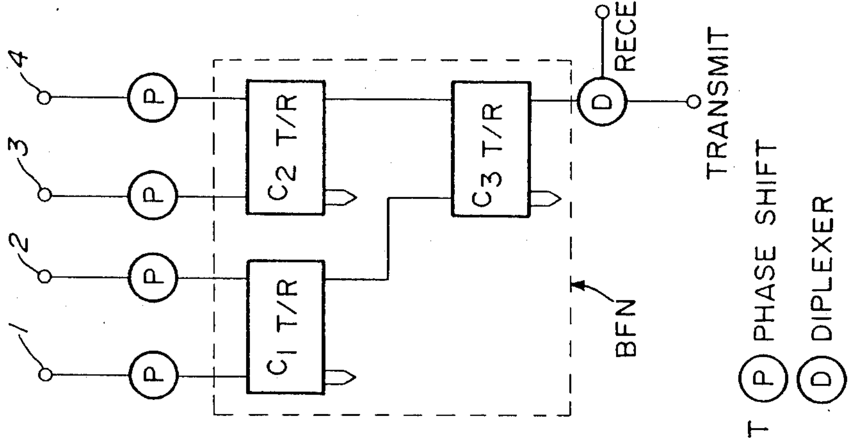
FIG. 4 shows a block diagram of a Beam-forming Network in accordance with the invention.
Figure 5:
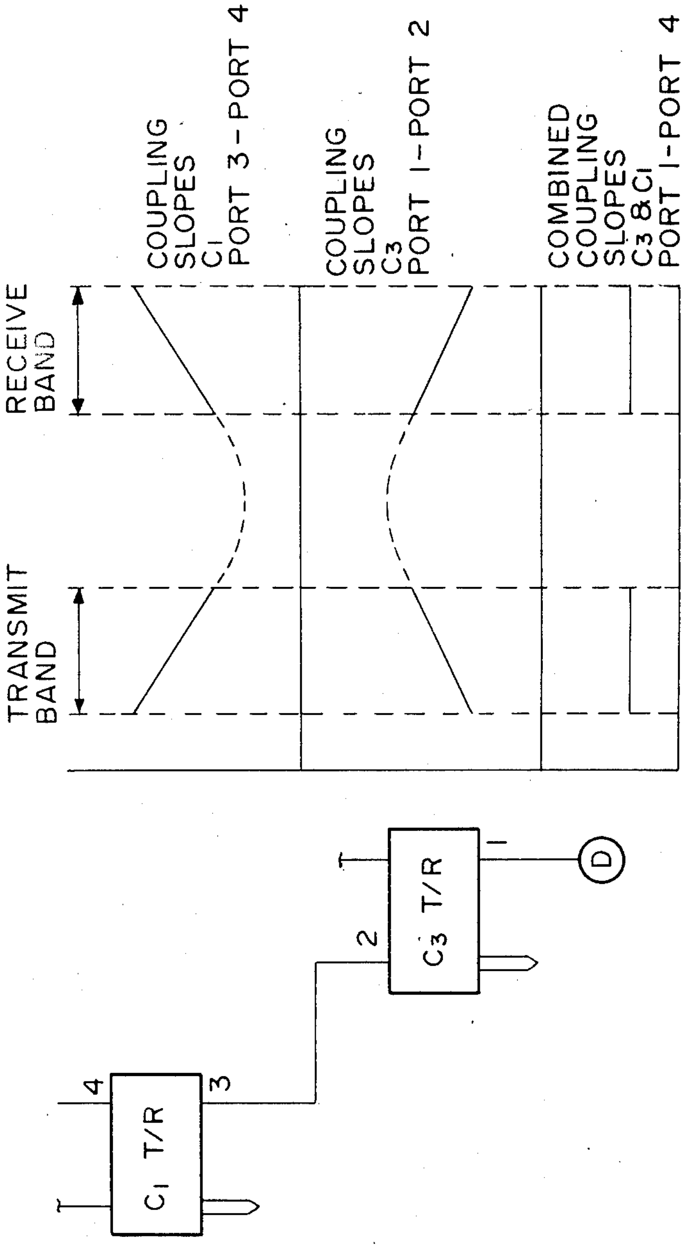
FIG. 5 illustrates how a BFN in accordance with the invention provides slope compensation.

FIG. 4 illustrates a transmit/receive BFN design in accordance with the present invention. The BFN, comprising couplers C1, C2 and C3, is connected to the third port of a diplexer D having a first port connected to a transmitter and a second port connected to a receiver. The third port of the diplexer is connected to a port at one side of a power divider such as directional coupler C3. Two ports on the other side of the directional coupler are connected, respectively, to ports on the one side of directional couplers C1 and C2. Each of the two ports on the other side of C1 and C2 are respectively connected to phase shifters P which are in turn connected to radiating elements 1, 2, 3 and 4. In accordance with the invention, the directional couplers have the design characteristics as illustrated in FIG. 3. That is, they will exhibit appropriate, and possibly different, coupling ratios at the transmit and receive frequencies. Moreover, as illustrated in FIG. 5, the slopes in amplitude of the coupled and transmitted through signals are self-compensating when more than one directional coupler is used in the BFN so that the frequency response of the BFN consisting of the assembly of C1, C2 and C3 is generally flat. For example in passing a signal through C3, and then through C1, (FIG. 5), the amplitude slopes imparted as a result of these passages are opposite, positive and negative, and thus self compensate. That is, when the amplitude of C1 is high, the amplitude of C3 is low and vice versa. Accordingly, as can be seen in the bottom-most graph, the response of the combination of the couplers is substantially flat over the transmitter frequency band and over the receiver frequency band.

As can be seen, the BFN contains less than half of the elements of a similar functioning BFN illustrated in FIG. 2. Thus, the inventive BFN as illustrated requires only three directional couplers versus six in the prior art, it requires only four phase shifters versus eight in the prior art, and it requires only a single diplexer versus four in the prior art. Accordingly, the weight of the inventive arrangement would be less than half the weight of the prior art arrangement.

Figure 6:
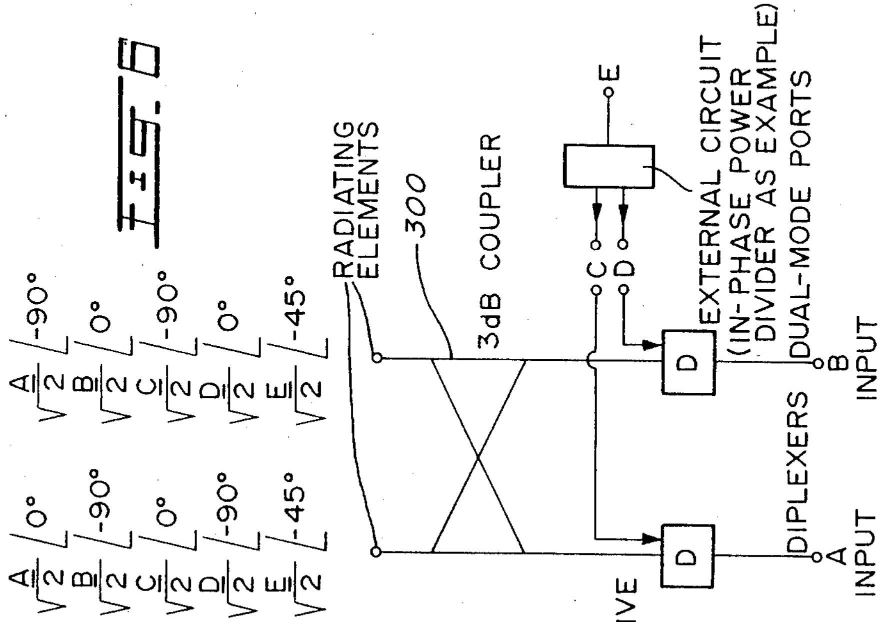
FIG. 6 illustrates a further embodiment of the invention.

Another class of BFN uses the so-called dual-mode technique which is illustrated in FIG. 6. A slightly more complex example of this dual-mode technique is covered in U.S. Pat. No. 4,223,283 issued Sept. 16, 1980 to K. K. Chan.

In the dual-mode technique, two independent frequency sources, A and B, will be connected to the same group of radiating elements without any cross-coupling using the directional coupler illustrated schematically at 300 in FIG. 6. Each of the power sources is fed to a separate diplexer, and the other of the diplexers are fed to the directional coupler.

The directional coupler may be connected to two receivers at ports C and D. Alternatively, ports C and D can be connected to an external circuit, for example, the in-phase arm of a "Magic T" whose port E would be connected to a single receiver. The table of vectors in FIG. 6 shows the phase relationships in this simple circuit and illustrates the in-phase equi-amplitude excitation of the two radiating elements as required for a single mode circuit.

Although particular embodiments have been illustrated, this was for the purpose of describing, but not limiting, the invention. Various modifications, which will come readily to the mind of one skilled in the art, are within the scope of the invention as defined in the appended claims.

I claim:

1. A Beam-forming Network for use in association with:

a plurality of radiating elements;

transmitter means having an output terminal and being operable at a transmitter frequency band; and receiver means having an input terminal and being operable at a receiver frequency band;

a diplexer having a first input port operable at a transmitter frequency band, having also a second output port operable at receiver frequency band, and having also a third input/output port operable simultaneously at both a transmitter and a receiver frequency band;

said Beam-forming Network interconnecting said transmitter means, said diplexer and said radiating elements and said Beam-forming Network also interconnecting said radiating elements, said diplexer and said receiver means;

said Beam-forming Network comprising a plurality of coupling means wherein said coupling means are variably responsive to a wide band of frequency including a transmitter frequency band and a receiver frequency band;

and wherein said coupling means have coupling ratios such that at least two coupling means have coupling ratios with an opposite slope in amplitude when varying with frequency in the transmit band, said at least two coupling means having coupling ratios with an opposite slope in amplitude when varying with frequency in the receive band, so that said coupling means are self-compensatingly responsive to said wide band of frequencies and said Beam-forming Network produces a compensated signal in both said transmit band and said receive band.

2. A Beam-forming Network as defined in claim 1 wherein said frequency band includes said transmitter frequency band and said receiver frequency band;

whereby said couplers present a substantially flat response over said transmitter frequency band and over said receiver frequency band.

3. A Beam-forming Network as defined in claim 2 wherein said power divider means comprises directional couplers.

4. A Beam-forming Network as defined in claim 3 wherein each said coupler is designed to have a design frequency intermediate said transmitter frequency band and said receiver frequency band.

5. A Beam-forming Network as defined in claim 4 wherein each said coupler is designed to have a first coupling ratio amplitude at the center of said transmitter frequency band and a first slope in amplitude of coupling ratios when varying with frequency in said transmitter frequency band, and a second coupling ratio amplitude at the center of said receiver frequency band, and a second slope in amplitude of coupling ratios when varying with frequency in said receiver frequency band.

6. A Beam-forming Network as defined in claim 5 wherein said first slope is equal but opposite to said second slope, and said first coupling ratio amplitude is equal to said second coupling ratio amplitude.

7. A Beam-forming Network as defined in claim 5 wherein said first slope is not equal and is opposite to said second slope, and said first coupling ratio amplitude is not equal to said second coupling ratio amplitude.

8. A Beam-forming Network as defined in claim 6 further including phase shifter means disposed between each said radiating element and its associated coupler.

9. A Beam-forming Network as defined in claim 7 further including phase shifter means disposed between each said radiating element and its associated coupler.

* * * * *